United States Patent
Lindner

(10) Patent No.: US 12,396,077 B2
(45) Date of Patent: Aug. 19, 2025

(54) ILLUMINANT DEVICE FOR EMITTING LIGHT OF A CONTINUOUSLY ADJUSTABLE COLOUR, IN PARTICULAR FOR INDIVIDUALIZING AND/OR ILLUMINATING AN INTERIOR SPACE

(71) Applicant: Webasto SE, Stockdorf (DE)

(72) Inventor: Thomas Lindner, Stockdorf (DE)

(73) Assignee: Webasto SE, Stockdorf (DE)

( * ) Notice: Subject to any disclaimer, the term of this patent is extended or adjusted under 35 U.S.C. 154(b) by 237 days.

(21) Appl. No.: 18/014,955

(22) PCT Filed: Jun. 23, 2021

(86) PCT No.: PCT/EP2021/067187
§ 371 (c)(1),
(2) Date: Jan. 6, 2023

(87) PCT Pub. No.: WO2022/008250
PCT Pub. Date: Jan. 13, 2022

(65) Prior Publication Data
US 2023/0262855 A1    Aug. 17, 2023

(30) Foreign Application Priority Data
Jul. 7, 2020    (DE) .......................... 102020117908.1

(51) Int. Cl.
*H05B 45/20*     (2020.01)
*B60Q 3/20*      (2017.01)
*B60Q 3/60*      (2017.01)

(52) U.S. Cl.
CPC .............. *H05B 45/20* (2020.01); *B60Q 3/20* (2017.02); *B60Q 3/60* (2017.02)

(58) Field of Classification Search
None
See application file for complete search history.

(56) References Cited

U.S. PATENT DOCUMENTS

| | | | |
|---|---|---|---|
| 7,572,017 B2 * | 8/2009 | Varaprasad | G02F 1/1524 359/603 |
| 8,193,737 B2 * | 6/2012 | Peker | G09G 3/3413 315/297 |

(Continued)

FOREIGN PATENT DOCUMENTS

| | | |
|---|---|---|
| CN | 1755566 A | 4/2006 |
| DE | 102013015343 A1 | 3/2015 |

(Continued)

OTHER PUBLICATIONS

International Search Report and Written Opinion for PCT/EP2021/067187, mailed Oct. 4, 2021.

*Primary Examiner* — Srinivas Sathiraju
(74) *Attorney, Agent, or Firm* — Command IP LLP; Michael Zarrabian

(57) ABSTRACT

The invention relates to an illuminant device for emitting light of a continuously adjustable colour, more particularly for individualizing and/or illuminating an interior, comprising the following:
  at least one illuminant unit comprising a plurality of illuminant elements;
  at least one driver unit which is configured to output driver current signals to the illuminant elements of the illuminant unit in such a way that a target colour of the illuminant unit can be set in accordance with the driver current signals;
  at least one computing unit, which is configured to calculate the driver current signals necessary for setting the target colour and to control the driver unit accordingly so that the driver unit outputs the driver current signals.

17 Claims, 3 Drawing Sheets

(56) References Cited

U.S. PATENT DOCUMENTS

Figure 1:
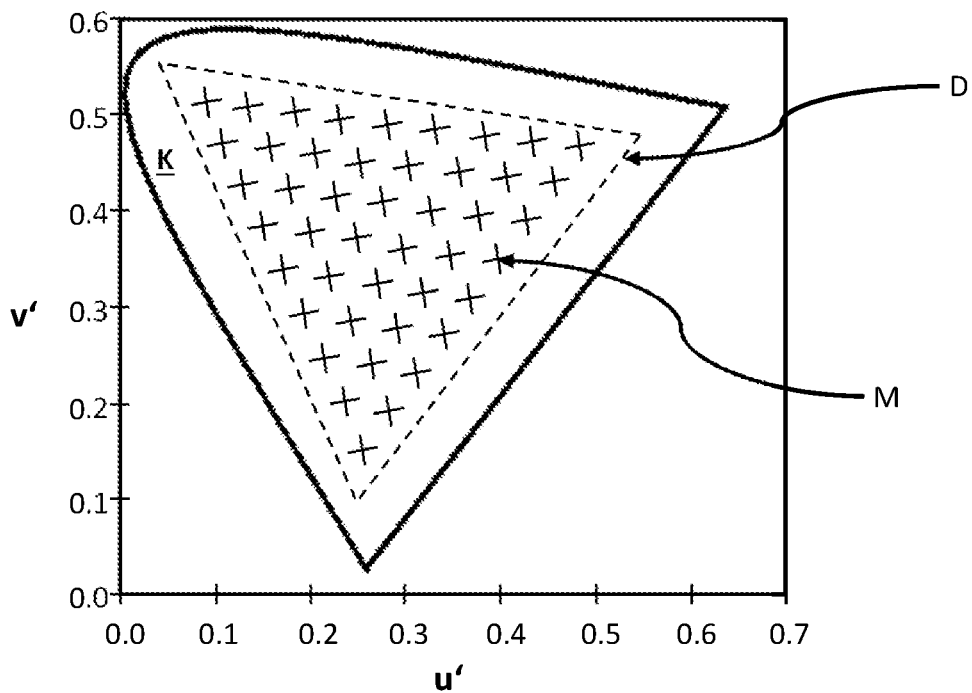

| | | | | |
|---|---|---|---|---|
| 9,434,303 | B2* | 9/2016 | Borgholthaus | B60Q 3/74 |
| 9,603,218 | B1* | 3/2017 | Bohler | H05B 45/60 |
| 10,064,256 | B2* | 8/2018 | Salter | B60Q 3/74 |
| 10,940,790 | B1* | 3/2021 | Mazuir | B60Q 3/80 |
| 11,833,959 | B1* | 12/2023 | Mazuir | B60Q 3/80 |
| 2002/0091991 | A1* | 7/2002 | Castro | G06F 9/06 |
| | | | | 717/106 |
| 2007/0183066 | A1* | 8/2007 | Varaprasad | B60R 1/12 |
| | | | | 359/844 |
| 2009/0302781 | A1* | 12/2009 | Peker | H05B 45/22 |
| | | | | 315/297 |
| 2013/0293147 | A1* | 11/2013 | Rogers | H05B 45/20 |
| | | | | 315/297 |
| 2015/0321603 | A1* | 11/2015 | Borgholthaus | B60Q 3/80 |
| | | | | 315/77 |
| 2016/0075275 | A1* | 3/2016 | Salter | B60Q 3/74 |
| | | | | 315/77 |
| 2017/0237946 | A1* | 8/2017 | Schofield | B60K 35/81 |
| | | | | 348/148 |
| 2017/0337813 | A1* | 11/2017 | Taylor | G05D 1/0285 |
| 2018/0257553 | A1* | 9/2018 | Salter | B60Q 3/74 |
| 2019/0075632 | A1* | 3/2019 | Isele | H05B 45/397 |
| 2019/0202290 | A1* | 7/2019 | Havemann | B60Q 3/14 |
| 2023/0262855 | A1* | 8/2023 | Lindner | H05B 45/20 |
| | | | | 315/77 |

FOREIGN PATENT DOCUMENTS

| | | | |
|---|---|---|---|
| DE | 102015118497 A1 | 5/2017 | |
| DE | 102016207723 A1 | 11/2017 | |
| DE | 102016207730 A1 | 11/2017 | |
| DE | 102016211737 A1 | 1/2018 | |
| WO | WO-2017062691 A1 * | 4/2017 | B60Q 3/74 |

* cited by examiner

ILLUMINANT DEVICE FOR EMITTING LIGHT OF A CONTINUOUSLY ADJUSTABLE COLOUR, IN PARTICULAR FOR INDIVIDUALIZING AND/OR ILLUMINATING AN INTERIOR SPACE

CROSS-REFERENCE TO RELATED APPLICATIONS

This application is a 35 U.S.C. § 371 National Stage Entry of International Application No. PCT/EP2021/067187 filed Jun. 23, 2021, which claims the priority benefit of German Patent Application Serial Number DE 10 2020 117 908.1 filed Jul. 7, 2020, all of which are incorporated herein by reference in their entirety for all purposes.

STATEMENT REGARDING FEDERALLY SPONSORED RESEARCH OR DEVELOPMENT

Not Applicable.

THE NAMES OF THE PARTIES TO A JOINT RESEARCH AGREEMENT

Not Applicable.

INCORPORATION-BY-REFERENCE OF MATERIAL SUBMITTED ON A READ-ONLY OPTICAL DISC, AS A TEXT FILE OR AN XML FILE VIA THE PATENT ELECTRONIC SYSTEM

Not Applicable.

STATEMENT REGARDING PRIOR DISCLOSURES BY THE INVENTOR OR A JOINT INVENTOR

Not Applicable.

BACKGROUND OF THE INVENTION

Field of the Invention

The invention relates to an illuminant device for emitting light of a continuously adjustable colour, in particular for individualising and/or illuminating an interior space, and to a corresponding method, to a vehicle according to the preamble of patent claim 15 and to a processor according to the preamble of patent claim 16.

Description of Related Art Including Information Disclosed Under 37 CFR 1.97 and 1.98

In prior art, luminaires are known for various applications, for example for use in the interior space of vehicles, wherein the luminaires serve to improve the spatial impression for passengers in the interior space. Luminaires are often used for this purpose whose perceptible light is mixed from light of several individual luminaires. An example of this is a so-called RGB-LED, in which red, green and blue light-emitting diodes (LEDs) are combined in such a way that their emitted light mixes to form a perceptible colour. With appropriate electronic control of the individual LEDs, the light of the RGB-LEDs mixes to a specific colour, for example white. The individual LEDs therefore have be calibrated so that when several of these RGB-LEDs are used, no discernible differences in colour and light intensity maybe perceived. In order to compensate for the production tolerances of individual LEDs during operation, a current has to be adjusted at the individual LEDs according to the calibration values obtained. Usually, LEDs are calibrated during their production, i.e., values such as the current intensity or the duty cycle of pulse width modulation (PWM) are determined, which are necessary to produce white light or light of a specific discrete colour. These calibration values are stored in an electronic module of the luminaires so that when the luminaires are operated, the discrete colour is produced in accordance with the calibrated values.

The above described method for generating a calibrated colour with respect to a luminaire is perceived as time-consuming and inflexible, since the calibration must be performed for each discrete target colour and the values have to be stored in the electronic module of a luminaire, and especially also for the reason that subsequent changes to the calibrated values stored in the electronic module require recalibration of the individual luminaires.

BRIEF SUMMARY OF THE INVENTION

It is therefore an object of the invention to provide an illuminant device for emitting light of a continuously adjustable colour, in particular for individualising and/or illuminating an interior space, as well as a corresponding method, which makes it possible to simplify the described efforts for setting or calibrating a colour of the illuminant device considerably, and to render it more flexible, in order to facilitate the individualisation of the light in an interior space by virtue of the illuminant device.

In particular, the object is solved by an illuminant device for emitting light of a continuously adjustable colour, in particular for individualising and/or illuminating an interior space, which comprises the following:
- at least one illuminant unit comprising a plurality of, preferably three, illuminant elements;
- at least one driver unit, which is configured to output driver current signals to the illuminant elements of the illuminant unit such that a target colour of the illuminant unit can be set in accordance with the driver current signals;
- at least one computing unit, preferably a microcontroller, which is configured to calculate the driver current signals necessary for setting the target colour and to control the drive unit so that the driver unit outputs the driver current signals.

There is one substantial idea of the invention not to use fixed calibration values to generate individual discrete colours, but instead to perform the calculation of the necessary values for any target colour directly in the illuminant device. In order to be able to adjust a target colour in the entire colour space—such as, for example, the RGB colour space-according to the invention, a calibration algorithm is provided in the illuminant device that enables continuous adjustment of all target colours of the colour space. Instead of a table or a list of discrete calibration values for corresponding target colours as with conventional RGB-LEDs, a calibration algorithm for the calibration of the illuminant elements is stored in a computing unit of the illuminant device. The target colour is set at runtime by specifying colour coordinates selected from the corresponding colour space. The calibration algorithm in the computing unit takes over the calculation for a corresponding adaptation of the current and/or voltage values of the driver current signals for the respective illuminant elements (e.g. by means of pulse width modulation) by which the illuminant unit is caused to illuminate using calibrated light. For this purpose, the individual illuminant elements are controlled or supplied with the driver current signals by the driver unit.

In a specific embodiment of the illuminant device, the illuminant elements are configured as LEDs. LEDs are inexpensive in manufacturing or purchase considering large quantities. In addition, they are characterised by a long service life, low power (current) consumption and remarkable energy efficiency, so that the illuminant device can be both manufactured cheaply and later operated in an energy-efficient and energy-saving manner. This aspect therefore becomes particularly advantageous when using a large number of illuminant devices according to the invention, such as in the interior space of a vehicle.

In one embodiment, the illuminant units of the illuminant device comprise at least one red illuminant element, at least one green illuminant element and at least one blue illuminant element, wherein the light emitted by the illuminant elements is mixed to form the target colour, which can be perceived in particular by an observer. By additive mixing of preferably three primary colours of individual illuminant elements, an additive colour space is defined which may respectively the reproduce colour perception of the human eye. In a specific embodiment, the three primary colours can be mixed, for example, from red, green and blue light, each of which is emitted by corresponding illuminant elements, to form a target colour. Thereby, a target colour is understood to mean that the emitted colours of the illuminant elements are mixed to form a single colour that is perceptible to the human eye—i.e., a person viewing the illuminant unit gets the impression that it is, for example, white light (or another special colour), although it is actually mixed from red, green and blue chromatic components.

In one embodiment, the illuminant device comprises an illuminant housing that includes the illuminant unit as well as the driver unit and preferably the computing unit. This allows the illuminant device to be made particularly compact and robust so that it can be integrated particularly easily into further components, for example in a vehicle.

In one embodiment, the computing unit of the illuminant device comprises at least one input interface, for example a BUS-interface, wherein the input interface is configured to transmit colour information data, in particular colour coordinates, for a respective target colour, and also preferably to initiate the calculation of the driver current signals for setting the target colour, taking into account the received colour information data.

These features allow to spectrally vary the target colour of the illuminant device or the illuminant unit with finest resolution, according to the data entered into the interface, based on internal calculation. Furthermore, the interface enables external access to the computing unit, for example also for software and/or firmware updates or to update data stored therein, which are relevant for the operation of the illuminant device. A BUS-interface at the illuminant device also has an advantage that the illuminant device can be connected to or integrated into other system components, for example of a vehicle, particularly easily. The direct input of the colour coordinates into the input interface allows the target colour to be calculated according to the input colour information data without the need for prior calibration of the target colour and without the need for the calibration values for the target colour to be stored in the memory of the computing unit. In this way, a high resolution of the colours of the colour space used is rendered possible in order to further increase the individualisation of the light.

In one embodiment, the driver unit and/or the computing unit of the illuminant device is adapted to individually calculate or output, respectively, the driver current signals for setting or changing the target colour based on current (intensity of current) adjustment and/or pulse width modulation (PWM).

By virtue of a control of the current adjustment and/or pulse width modulation with regard to the illuminant elements, the colour of the luminaires can be graded very precisely so that the illuminants emit light uniformly with the desired colour. At the same time, it is possible to individually compensate for the influences of temperature and ageing of the illuminants. Altogether, the colour perception and thus the individualisation of an interior lighting is improved hereby in a simple manner.

In one embodiment, the computing unit of the illuminant device comprises a storage medium configured to store colour reference data and/or a calibration algorithm for calculating the necessary driver current signals for setting or changing the target colour.

An internal storage medium in the illuminant device is used to perform data and/or algorithms for the illuminant device's internal calculations of the target colour in a cost-effective manner. By respectively adjusting the driver current signals at the (individual) illuminant elements, production tolerances of the illuminant elements may be compensated according to colour reference data (from the manufacturer). These colour reference data are data or values that are recorded (in advance), for example during the production of the illuminant elements. These colour reference data are concrete current or voltage values that must be applied to the illuminant elements to produce a specific colour. Calibration values for white light or for specific target colours do not need to be stored any more in the memory of the computing unit. A calibration algorithm may perform a calculation for necessary current or voltage values based on the received colour information data. The calibration algorithm may take into account the colour reference data stored in the storage medium in order to optimise the computing time and thus the energy consumption of the illuminant device.

In particular, the object underlying the invention is also solved by a method for operating an illuminant device for emitting light of a continuously adjustable colour, in particular for individualising and/or illuminating an interior space, the method comprising the following steps:

a) Inputting colour information data, in particular colour coordinates, for a target colour into an illuminant device;

b) Calculating the necessary driver current signals to generate the target colour by means of a calibration algorithm in a computing unit of the illuminant device;

c) Outputting the driver current signals by means of a drive unit of the illuminant device to at least one illuminant unit for generating the target colour.

Hereby, the same advantages as already described in connection with the illuminant device are achieved.

In one embodiment, the method comprises a second input of second colour information data for a second target colour into the illuminant device, which results in a repeated execution of step b), and the driver current signals are adjusted in step c) according to the second target colour to change the light emitted by the illuminant device from the target colour to the second target colour. By this, the individualisation of the light emitted by the illuminating device is further optimized and colour perception is further improved.

In one embodiment, steps a)-c) of the method and/or a/the second input of second colour information data are each performed during runtime. This allows to change the target colour of the illuminant device without having to interrupt the emission of light. Thus, the individualisation of the light of the illuminating device is increased and the change of the target colour via a smooth gradient is made possible to enable the colour of the illuminating device to be changed as pleasantly as possible.

In one embodiment, the colour information data comprises chromatic colour coordinates, in particular RGB-values, for the target colour and/or luminous intensity values for the target colour. This enables not only the target colour of the illuminant device to be changed in a calibrated manner, but also the brightness or intensity of the target colour to be changed in a calibrated manner via the calibration algorithm. In this way, it is achieved that the settings of the light can be realised in an identical manner for all illuminants present in the system, so that the user acquires a harmonious colour impression.

In one embodiment, the driver current signals calculated internally in the illuminant device are adapted for setting or changing the target colour individually for each illuminant element based on current (intensity of current) adjustment and/or pulse width modulation (PWM). By controlling the illuminant elements via a current by means of current adjustment and/or pulse width modulation, the colour of the luminaires may be graded very precisely so that the illuminants emit light uniformly with the desired colour. At the same time, it is possible to individually compensate for the influences of temperature and ageing of the illuminants.

Altogether, this improves the colour perception and thus the individualisation of an interior lighting in a simple and cost-effective way.

In one embodiment, all colours of a colour space, in particular of the RGB colour space, can be continuously set as the target colour by, in particular, directly entering or receiving corresponding colour information data. The direct input of the colour coordinates enables the target colour to be calculated according to the input colour coordinates without the need for corresponding calibration values for the input colour coordinates to be present in the illuminant device or the corresponding computing unit. In this way, a high resolution of the colours of the colour space used is made possible in order to further increase the individualisation of the light.

In one embodiment, the calculation of the necessary driver current signals for generating the target colour is carried out by means of a calibration algorithm in a computing unit of the illuminant device, optionally taking into account reference data, the reference data comprising, in particular, manufacturer's data and/or data sets for individual illuminant elements. This enables computing time to be shortened or optimised, if applicable. For example, reference data for "standard colours"—i.e., colours that are to be generated repeatedly—can be stored. These data may, for example, be provided by a manufacturer of the illuminant elements. If an input for such a standard colour is made at the interface of the illuminant device, the corresponding algorithm can be shortened and it may be relied on the reference data for use. This enables energy-efficient operation of the illuminant device.

In particular, the object underlying the invention is also solved by a processor, in particular a microprocessor, which contains instructions for causing, by executing the instructions, a method according to one of the preceding claims to be carried out.

This results in the same advantages as already described in connection with the illuminant device and/or the method for operating the illuminant device.

In particular, the object underlying the invention is also solved by a vehicle comprising a processor as described above and/or an illuminant device as described above.

This results in the same advantages as already described in connection with the illuminant device and/or the method for operating the illuminant device and/or the processor described above.

Further advantageous embodiments become evident from the dependent claims.

BRIEF DESCRIPTION OF THE SEVERAL VIEWS OF THE DRAWING(S)

In the following, the invention is also described with regard to further features and advantages by means of embodiments, which are explained in more detail with reference to the drawings.

Figure 2:
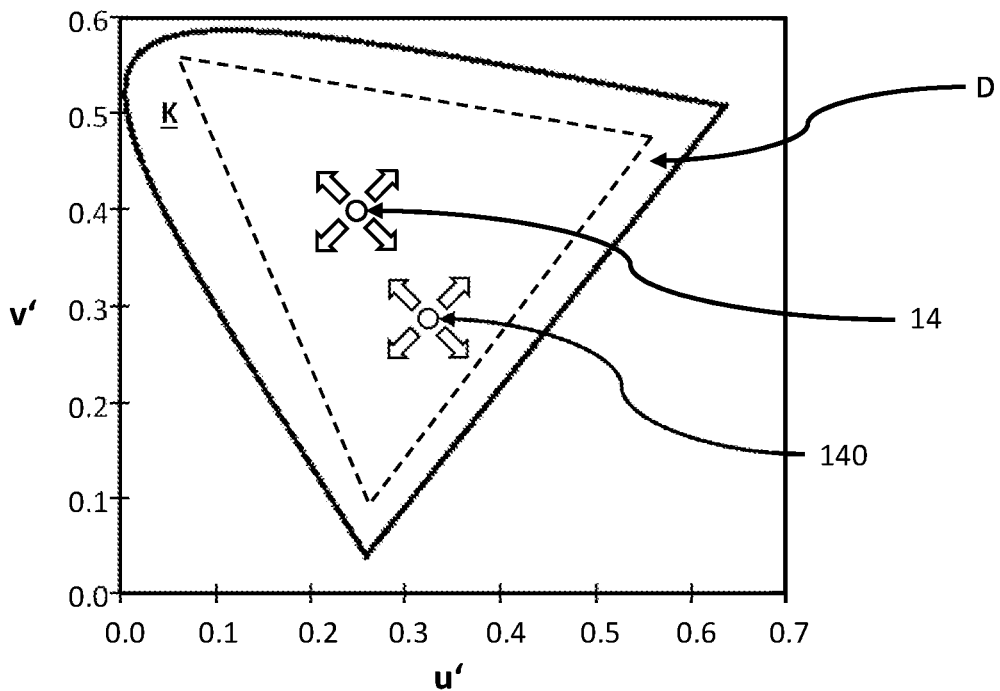
Figure 3:
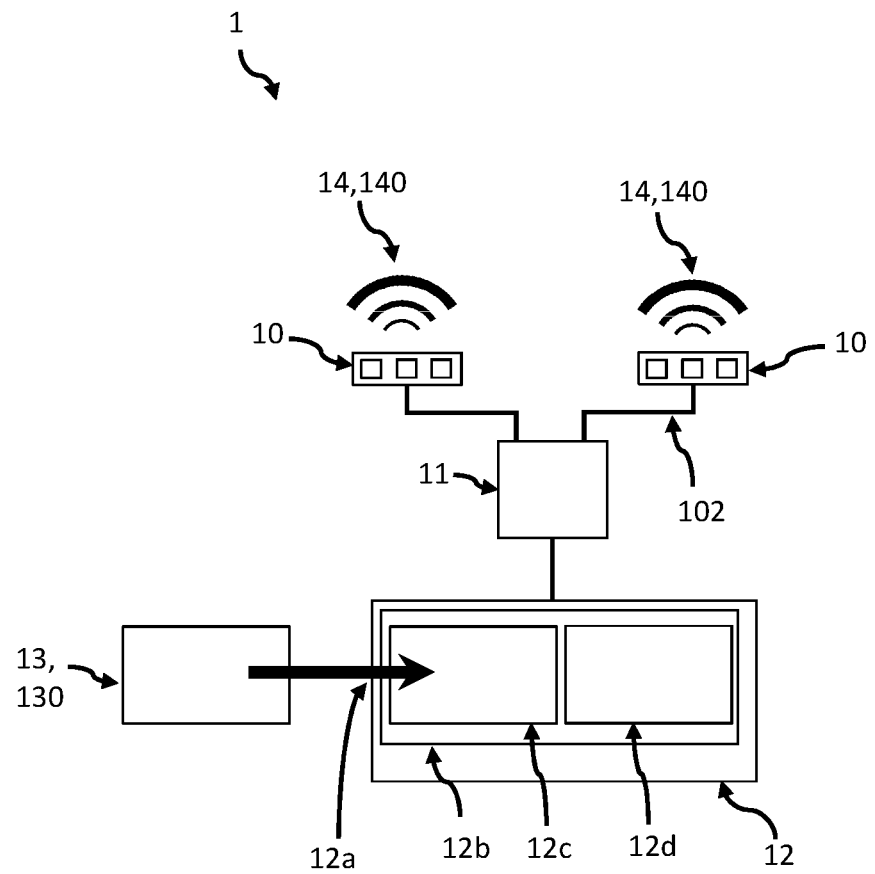
Figure 4:
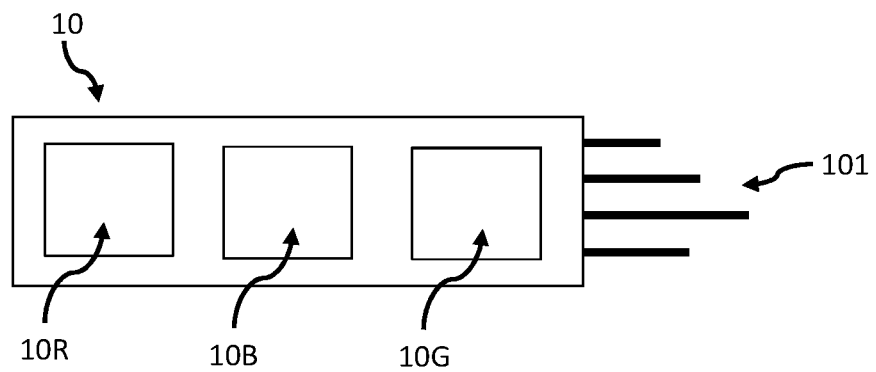
Figure 5:
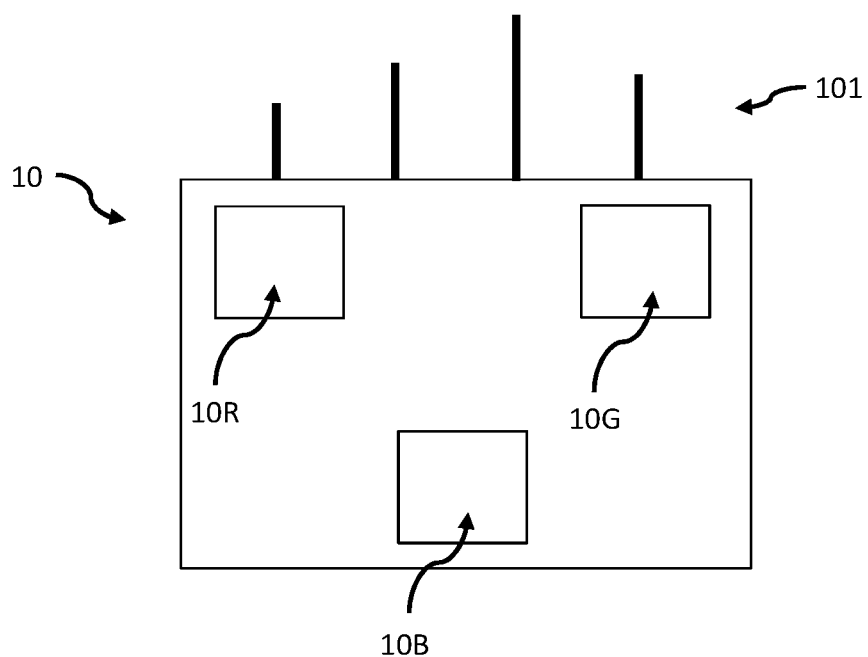

Hereby, there is depicted in:

FIG. 1 a schematic illustration of a colour space with discrete colour values for discrete target colours, as it may be realised in prior art;

FIG. 2 a schematic illustration of a colour space with continuously adjustable colour values for target colours, as can be realised with the illuminant device according to the invention;

FIG. 3 a schematic illustration of the illuminant device according to the invention;

FIG. 4 a schematic illustration of a possible embodiment of an illuminant unit;

FIG. 5 a schematic illustration of an alternative embodiment of an illuminant unit.

DETAILED DESCRIPTION OF THE INVENTION

FIG. 1 shows a colour space K in an u'v'-diagram to illustrate the state of the art, using the CIE 1976 colour coordinates (CIE 1976 UCS diagram). For example, the colour space K is an RGB-colour space in which a colour may be represented by corresponding u', v' coordinates. If an RGB-luminaire (for example an RGB-LED) is used with a red, green and blue luminaire to produce one (mixed) colour of the RGB-luminaire, all achievable colours lie in a triangle D (gamut).

The discrete values M in the triangle D stand for discrete colour values of an ordinary RGB-luminaire, which can be stored there in a corresponding electronic module as described above. A colour of the RGB-luminaire may therefore only assume the colours corresponding to the values M. Corresponding current or operating values for the individual LEDs have to be calibrated in complex procedures and programmed into the luminaire. The other colour values—the continuum between the discrete values M in the triangle D—is not achievable for the ordinary RGB luminaire of this comparative example. These colours (between the values M) can therefore not be produced or emitted using that luminaire.

In FIG. 2, the colour space K and the triangle D are shown in a manner analogously to FIG. 1. However, the effect of the illuminant device according to the invention is shown here in schematic form. The illuminant device may continuously adjust target colours 14, 140 in the colour space K in the highest resolution.

The above explanations of FIGS. 1 and 2 are for illustrative purposes only. Of course, it must be taken into account that the actual representation of colour spaces is very complex. Accordingly, no linguistic distinction is made between colour space K and triangle D in the other parts of the present application.

FIG. 3 schematically shows an illuminant device 1 of an embodiment. In this embodiment, the illuminant device 1 comprises a computing unit 12, a driver unit 11 and two illuminant units 10.

In this embodiment, the computing unit 12 is designed as a microprocessor which has a corresponding storage medium 12b. This storage medium 12b contains a calibration algorithm 12c and, if applicable, colour reference data 12d.

Furthermore, the computing unit 12 has an input interface 12a. Colour information data 13 may be input or received via such interface 12a. In one embodiment, the input interface is a BUS-interface, for example a CAN-BUS-interface or a comparable interface system.

Colour information data 13 is to be understood substantially as colour coordinates for a desired target colour 14 related to a colour space K (FIG. 2). These may, for example, comprise concrete coordinates of a colour space K for each illuminant unit 10 and/or luminous intensities or intensities for each illuminant unit 10 (or for individual illuminant elements). It is also possible for the colour information data to include an RGB mixing ratio for a target colour. Moreover, the colour information data 13 may include an indication of a desired colour temperature for the target colour 14.

By inputting the colour information data 13 into the input interface 12a, it becomes possible that the target colour 14 can be calculated according to the input colour information data 13 by means of the calibration algorithm 12c. The calibration algorithm 12c may thereby take into account the colour reference data 12d (on the storage medium 12b) in order to optimise a computing time and thus an energy consumption of the illuminant device 1. For example, the colour reference data 12d may comprise typical luminous intensities or candela values of the red, green and blue illuminant elements 10R, 10G, 10B. The colour reference data 12d may further include entire data sets that are usually included in (manufacturer's) data sheets of the illuminant elements and that are helpful (in terms of performance) or necessary for performing the calibration algorithm 12c. For example, (non-linear) variation values of a luminous intensity of an illuminant element with respect to an applied driver current may also be stored in the colour reference data 12d. The colour reference data 12d can be input to the computing unit 12 of the illuminant device 1 via the interface 12a.

The input of the colour information data 13 into the interface 12a may, for example, be performed by a system component of a vehicle, such as a board computer. However, according to the invention, the colour information data 13 may also be entered via a user terminal such as a smartphone and/or a remote control.

The calibration algorithm 12c in the computing unit 12 calculates necessary driver current signals for the respective illuminant elements 10R, 10G, 10B (see FIG. 3) of the illuminant units 10. The information calculated by the calibration algorithm 12c is transferred from the computing unit 12 to the drive unit 11.

Accordingly, the driver unit 11 controls the illuminant units 10 via respective lines 102 with the calculated driver current signals to generate the target colour 14 based on the input colour information data 13. The lines 102 may include respective series resistors for the illuminant elements 10R, 10G, 10B.

In one embodiment, the driver current signals for setting or changing the target colour 14 are based on a current (intensity of current) adjustment and/or a pulse width modulation (PWM). The individual illuminant elements 10R, 10G, 10B are controlled or supplied with the driver current signals accordingly by the driver unit 11 for this purpose.

According to the invention, the two illuminant units 10 of the illuminating device 1 may illuminate with the same or different target colours 14, 140.

FIG. 4 shows an embodiment of an illuminant unit 10. In this embodiment, the illuminant unit 10 comprises three illuminant elements 10R, 10G, 10B. These may be formed, for example, by a red LED 10R, a green LED 10G and a blue LED 10B. Alternatively, the illuminant elements 10R, 10G, 10B may also be formed by OLEDs or the like. In the embodiment, the illuminant elements 10R, 10G, 10B are arranged side by side in a row. Furthermore, the illuminant unit 10 comprises terminals 101 for connection via the lines 102 to the driver unit 11 (cf. FIG. 3).

The illuminant unit 10 may further comprise optical elements such as a diffuser configured to cause the light from the illuminant elements 10R, 10G, 10B to mix by diffuse reflection to form the target colour 14. Alternatively or additionally, imaging elements may be provided for a combination of illuminant elements 10R, 10G, 10B or for individual illuminant elements 10R, 10G, 10B, which are configured to influence the radiated light of the illuminant unit 10 in its radiation characteristic, for example in its direction and/or divergence.

FIG. 5 shows an alternative embodiment of an illuminant unit 10 of an illuminant device 1. The illuminant elements 10R, 10G, 10B are thereby arranged in a different configuration than in FIG. 4. According to the invention, any arrangement of the illuminant elements 10R, 10G, 10B in the illuminant unit is encompassed. Also, the number of three illuminant elements 10R, 10G, 10B per illuminant unit 10 is merely exemplary and not limited thereto according to the invention. Likewise, arrangements are conceivable in which several illuminant elements of each colour are contained per illuminant unit. It is not mandatory that there is present the same number of illuminant elements per colour. For example, an arrangement is conceivable in which, for example, several illuminant elements of one colour are present, but only one illuminant element of each of the remaining colours.

At this point, it should be noted that all the parts described above are claimed as being relevant to the invention when considered individually or in any combination, in particular the details shown in the drawings.

LIST OF REFERENCE SIGNS

1 Illuminant device
10 Illuminant unit
10R Illuminant element
10G Illuminant element
10B Illuminant element
101 Terminals of the illuminant unit
102 Lines
11 Driver unit
12 Computing unit
12a Input interface
12b Storage medium
12c Calibration algorithm 12d Colour reference data
13 Colour information data
130 Second colour information data
14 target colour, as perceived by the human eye
140 Second target colour, as perceived by human eye
K Colour space
D Triangle (Gamut)

The invention claimed is:

1. An Illuminant device for emitting light of a continuously adjustable colour in a colour space, comprising the following:
at least one illuminant unit comprising a plurality of illuminant elements;
at least one driver unit which is configured to output driver current signals to the illuminant elements of the illuminant unit in such a way that a target colour of the illuminant unit can be set in accordance with the driver current signals;
at least one computing unit, which comprises a storage medium on which a calibration algorithm is stored for calculating the driver current signals necessary for setting the target colour and the computing unit being configured to control the driver unit accordingly so that the driver unit outputs the driver current signals,
wherein the computing unit comprises at least one input interface which is configured to receive colour coordinates for a target colour in the colour space, wherein the computing unit is configured to calculate the driver current signals for setting the target colour taking into account the received colour coordinates and to enable continuous adjustment of all target colours of the colour space.

2. The Illuminant device according to claim 1, wherein the illuminant elements are configured as LEDs.

3. The Illuminant device according to claim 2, wherein the illuminant units comprise at least one red illuminant element, at least one green illuminant element, and at least one blue illuminant element, and
the light emitted by the illuminant elements mixes to form the target colour, which can be perceived by an observer.

4. The Illuminant device according to claim 3, wherein an illuminant housing comprising the illuminant unit as well as the driver unit and the computing unit.

5. The Illuminant device according to claim 4, wherein the input interface is a BUS interface.

6. The Illuminant device according to claim 5, wherein at least one of the driver unit and the computing unit is adapted to individually calculate or output the driver current signals for adjusting or changing the target colour based on at least one of current matching and pulse width modulation (PWM).

7. The Illuminant device according to claim 6, wherein the storage medium is further adapted to store colour reference data.

8. A Method for operating an illuminant device for emitting light of a continuously adjustable colour in a colour space, the method comprising:
inputting colour coordinates for a target colour in a colour space into an illuminant device;
calculating the necessary driver current signals for generating the target colour by means of a calibration algorithm on a computing unit of the illuminant device; and
outputting the driver current signals by means of a driver unit of the illuminant device to at least one illuminant unit for generating the target colour,
wherein the computing unit is adapted to enable continuous adjustment of all target colours of the colour space.

9. The Method according to claim 8, wherein
a second input of second colour coordinates for a second target colour to the illuminating device results in a re-execution of calculating the necessary driver current signals, and the driver current signals are adjusted in outputting the driver current signals in accordance with the second target colour to change the light emitted by the illuminant device from the target colour to the second target colour.

10. The Method according to claim 9, wherein
at least one of: inputting the colour coordinates, calculating the necessary driver current signals, outputting the driver current signals, and the second input of second colour coordinates are performed in each case at runtime.

11. The Method according to claim 10, wherein the colour coordinates comprises chromatic colour coordinates for at least one of the target colour and luminous intensity values for the target colour.

12. The Method according to claim 11, wherein
the driver current signals calculated in the illuminant device for adjusting or changing the target colour based on at least one of current adjustment and pulse width modulation (PWM) are adjusted individually for each illuminant element.

13. The Method according to claim 12, wherein
all colours of a colour space (K) are continuously set as the target colour by inputting corresponding colour coordinates.

14. The Method according to claim 13, wherein
the calculation of the necessary driver current signals for generating the target colour is carried out by means of a calibration algorithm on a computing unit of the illuminant device taking into account reference data, the reference data comprising manufacturer-side data and/or data records for individual illuminant elements.

15. A system comprising a Processor configured to:
input colour coordinates for a target colour in a colour space into an illuminant device;
calculate the necessary driver current signals for generating the target colour by means of a calibration algorithm on a computing unit of the illuminant device; and
output the driver current signals by means of a driver unit of the illuminant device to at least one illuminant unit for generating the target colour,
wherein the computing unit is adapted to enable continuous adjustment of all target colours of the colour space.

16. The system of claim 15, further comprising: a Vehicle, wherein the vehicle comprises the processor.

17. The Illuminant device according to claim 1, wherein the calibration algorithm is adapted to calculate the driver current signals necessary for setting the target colour without prior calibration of the target colour and without calibration values for the target colour being stored on the storage medium of the computing unit.

* * * * *